March 29, 1938.　　　L. B. SELF　　　2,112,426
NUT TOASTER
Filed June 1, 1937
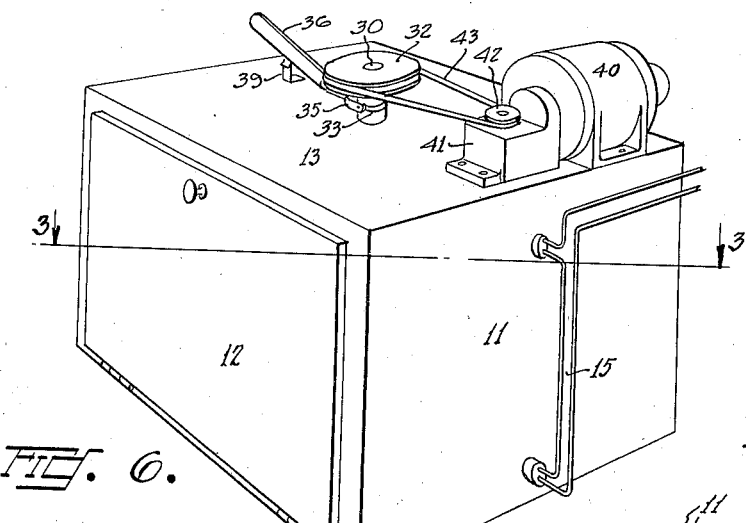
INVENTOR.
L. B. SELF Patented Mar. 29, 1938

2,112,426

UNITED STATES PATENT OFFICE 2,112,426

NUT TOASTER

Luther B. Self, Portland, Oreg.

Application June 1, 1937, Serial No. 145,823

2 Claims. (Cl. 34—21)

This invention relates generally to food processing, and particularly to a nut toaster.

The main object of this invention is the provision of an exceedingly simple and efficient form of nut toasting machine wherein the nuts may be uniformly toasted without any danger of some of the nuts becoming burned or discolored.

The second object is the construction of a nut toaster wherein the temperature may be kept to a minimum degree and the labor required in the operation thereof be reduced to a minimum.

I accomplish these and other objects in the manner set forth in the following specification as illustrated in the accompanying drawing, in which:

Fig. 1 is a perspective view of the nut toaster.

Fig. 2 is a section taken along the line 2—2 in Fig. 3.

Fig. 3 is a horizontal section taken along the line 3—3 in Fig. 1.

Fig. 4 is a vertical section taken along the line 4—4 in Fig. 3.

Fig. 5 is a section taken along the line 5—5 in Fig. 4.

Fig. 6 is a fragmentary section taken along the line 6—6 in Fig. 4.

Similar numerals refer to similar parts throughout the several views.

Referring in detail to the drawing, there is shown an oven consisting of the bottom 10, the sides 11 on one of which is mounted the door 12. Across the sides 11 is placed a top 13. The sides 11, as well as the bottom 10 and top 13, are preferably of a double wall construction for insulating purposes.

Resting on the bottom 10 is a hot plate 14 to which current supplied through the conductor 15, preferably under the control of a thermostat (not shown). On the inner faces of the sides 11 are the shelf brackets 16 upon which is mounted a toasting pan 17. Over the pan 17 is placed a bearing 18 from which radiate the arms 19 whose outer ends 20 are downturned below the upper edge 21 of the pan 17. The outermost ends 22 are adapted to guide against the lateral sides 11 and to stop against the rearmost side 11.

Extending vertically through the bearing 18 is a shaft 23 on whose lower end is secured the double bladed agitator 24 whose leading edges 25 are close to the bottom 26 of the pan 17. The shape of the blades 27 is such as to provide the desired stirring action without causing the nuts to accumulate unevenly on the bottom 26.

On the upper end of the shaft 23 is secured a socket 28 into which extends the square end 29 of the shaft 30 which journals in the bearing 31 and has secured on its upper end a pulley 32. The shaft 30 is slidable within the bearing 31 and is provided with a grooved collar 33 which receives the fingers 34 of the forked arm 35 which is formed on the hand lever 36 which is pivotally mounted on the pin 37 of the standard 38. A spring latch 39 is provided to hold the lever 36 in a depressed position when it is desired to remove or insert the pan 17.

In other words, when the hand lever 36 is depressed the shaft end 29 is withdrawn from the socket 28 and permits the withdrawal of the pan 17 from the oven.

On the top 13 is mounted a motor 40 which through a reduction bearing contained within the housing 41 drives a pulley 42. A belt 43 passes around the pulleys 42 and 32. With this construction it is possible to revolve the blades 27 slowly around the bottom 26 of the pan 17 thereby preventing any of the nut kernels from remaining in contact with the bottom 26 for an objectionably long period of time.

It can also be seen that since the agitation is continuous, the door 12 may be left closed and the heat losses will thereby be reduced to a minimum and that the temperature of the heat element may be maintained at a lower level which is obviously beneficial to the toasting operation.

When it is desired to remove a batch of nuts from the oven, it is only necessary to depress the lever 36 which will hold the end 29 out of engagement with the socket 28 and permit the pan 17 to slide in or out along the shelf brackets 16.

It will be noted that the agitator is provided with a boss 44 on its lower end in order to hold the edges 25 away from immediate contact with the bottom 26.

It is desirable in most cases to provide a second heating element 45 on the upper side of the pan 17. Naturally, this element must be so constructed as to allow the shafts 23 and 30 to extend therethrough.

I am, of course, aware that numerous forms of nut roasting machines have been developed in the past, the common form being of the tumbling barrel type. This is objectionable on account of the breakages which occur in the nut meats during the tumbling operation. It will be borne in mind that this device is especially adaptable to the dry toasting process as distinguished from the so called toasting process in which the nuts are dipped into hot oil.

I claim:

1. A nut toaster having in combination an oven, a pan slidably mounted in said oven, a bearing attached to said pan, a vertical shaft supported by said bearing having agitator blades at the lower end thereof contacting the bottom of the pan, a drive shaft mounted in the top of said oven having a coupling for removably attaching same to the shaft of said pan and means for operating said drive shaft.

2. A nut toaster having in combination an oven, a pan slidably mounted in said oven, a bearing attached to said pan, a vertical shaft supported by said bearing having agitator blades at the lower end thereof contacting the bottom of the pan, a drive shaft mounted in the top of said oven having a coupling for removably attaching same to the shaft of said pan, means for operating said drive shaft and means for disconnecting the driving mechanism from said agitator blades for the purpose of expediting the moving of said pan into or out of said oven.

LUTHER B. SELF.